124,041

UNITED STATES PATENT OFFICE.

JULIUS EDMUND DOTCH, OF WASHINGTON, DISTRICT OF COLUMBIA.

IMPROVEMENT IN DEODORIZING AND FERTILIZING MATERIALS.

Specification forming part of Letters Patent No. 124,041, dated February 27, 1872; antedated February 14, 1872.

*To all whom it may concern:*

Be it known that I, JULIUS EDMUND DOTCH, of Washington, District of Columbia, have invented a new and Improved Deodorizing and Fertilizing Material; and I do hereby declare that the following is a full and exact description thereof.

The nature of my invention consists in treating pulverized clay, argillaceous earth, clay-marl, &c., with sulpho-muriatic acid.

Clay treated in this manner will prove a more permanent disinfectant than common dry clay or earth, in destroying at once parasites and fungi, disinfecting all organic matter absorbed from the atmosphere, and, when mixed with night-soil. &c., fixes all the ammonia in soluble form, making it the more valuable for manure, and, being more porous than common clay, converts heavy soil, inaccessible to air before for that reason, into a more productive one.

Clay treated in this manner I mix sometimes with coal-ashes, coke, powdered coal, or gas-house silt. I employ it most generally as a substitute for dry earth or other disinfectants in earth-closets, common privies, sinks, manure-pits, and all such places where a permanent disinfectant is desired.

What I claim as my invention, and desire to secure by Letters Patent, is—

1. The treatment of dry earth, clay, argillaceous earth, clay-marl with sulpho-muriatic acid, for disinfecting and fertilizing purposes in general, and more particularly to be mixed with night-soil in common privies, carts, earth-closets, manure-pits, &c.

2. The admixture of coal-ashes, powdered coal, or coke, or gas-house silt, &c., to such prepared earth or clay.

JULIUS EDMUND DOTCH.

Witnesses:
T. C. CONNOLLY,
E. A. ELLSWORTH.